United States Patent
Hamano et al.

(10) Patent No.: US 8,029,930 B2
(45) Date of Patent: *Oct. 4, 2011

(54) POSITIVE ELECTRODE MATERIAL FOR LITHIUM SECONDARY BATTERY, METHOD FOR PRODUCING THE SAME, AND LITHIUM SECONDARY BATTERY

(75) Inventors: Yoshiaki Hamano, Chiba (JP); Hidefumi Konnai, Chiba (JP)

(73) Assignee: Kawatetsu Mining Co., Ltd., Tokyo (JP)

(*) Notice: Subject to any disclaimer, the term of this patent is extended or adjusted under 35 U.S.C. 154(b) by 675 days.

This patent is subject to a terminal disclaimer.

(21) Appl. No.: 10/713,104

(22) Filed: Nov. 17, 2003

(65) Prior Publication Data

US 2004/0110065 A1 Jun. 10, 2004

(30) Foreign Application Priority Data

Dec. 6, 2002 (JP) ................. 2002-355937

(51) Int. Cl.
*H01M 4/58* (2010.01)
*C01D 1/02* (2006.01)

(52) U.S. Cl. .............. 429/231.1; 429/231.3; 429/223; 429/231.95; 429/231.6; 423/594.6

(58) Field of Classification Search .............. 429/231.3, 429/223, 231.6, 231.95; 423/594.4, 594.6, 423/594.16; 252/513, 182.1, 521.2; 204/292
See application file for complete search history.

(56) References Cited

U.S. PATENT DOCUMENTS

| | | | |
|---|---|---|---|
| 2002/0055041 A1* | 5/2002 | Kobayashi et al. | 429/221 |
| 2002/0192552 A1* | 12/2002 | Lampe-Onnerud et al. | 429/223 |
| 2004/0110066 A1* | 6/2004 | Hamano et al. | 429/231.3 |

FOREIGN PATENT DOCUMENTS

| | | |
|---|---|---|
| EP | 0 712 172 A2 | 5/1996 |
| EP | 0 849 817 A2 | 6/1998 |
| JP | A 6-275277 | 9/1994 |
| JP | A 9-17430 | 1/1997 |
| JP | A 10-79250 | 3/1998 |
| WO | WO 98/57890 | 12/1998 |

* cited by examiner

*Primary Examiner* — Raymond Alejandro
(74) *Attorney, Agent, or Firm* — Oliff & Berridge, PLC

(57) ABSTRACT

A positive electrode material for a lithium secondary battery, which is high in safety, high in capacity, excellent in cycle performance, and high in charge/discharge efficiency, is provided. The positive electrode material for a lithium secondary battery is a powder containing a Li—Ni—Co—O or Li—Ni—Co—Ba—O system component as a main component and having an amorphous phase of an oxide mixed in each of particles or formed at the surface of the particle.

12 Claims, No Drawings

POSITIVE ELECTRODE MATERIAL FOR LITHIUM SECONDARY BATTERY, METHOD FOR PRODUCING THE SAME, AND LITHIUM SECONDARY BATTERY

BACKGROUND OF THE INVENTION

1. Field of the Invention

The present invention relates to a positive electrode material for a lithium secondary battery, to a method for producing the same, and to a lithium secondary battery using the same. More particularly, it relates to a novel material obtained by improving a positive electrode material for a lithium secondary battery having a Li—Ni—Co—O or Li—Ni—Co—Ba—O system composition, to a method for producing the same, and to a lithium secondary battery using the novel material.

2. Description of the Related Art

Recent years have seen various improvements in a positive electrode material for a lithium secondary battery. As a positive electrode material for a high-capacity secondary battery, a material having a Li—Ni—Co—O or Li—Ni—Co—Ba—O system composition can be listed.

For example, there is a positive electrode material which is a compound represented by a chemical formula $Li_{1-x-a}A_x Ni_{1-Y-b}B_y O$ where A: one alkaline earth metal element of either strontium or barium, or at least two alkaline earth metal elements selected from magnesium, calcium, strontium and barium B: at least one transition metal element other than Ni X: a total number of moles of A and $0<X\leq0.10$ Y: a total number of moles of B and $0<Y\leq0.30$ a: $-0.10\leq a\leq0.10$ b: $-0.15\leq b\leq0.15$ (see, e.g., Japanese Unexamined Patent Publication No. HEI 9-17430 (pp. 2-8)).

There is another positive electrode material which is a compound represented by a chemical formula $Li_{1-x-a}A_x Ni_{1-Y-b}B_y O$ and forming secondary particles with an average diameter of 5.0 μm to 50 μm as an aggregate of primary particles with an average diameter of 0.01 μm to 5.0 μm where A: strontium or barium B: at least one transition metal element X: a total number of moles of strontium or barium and $0<x\leq0.10$ Y: a total number of moles of all transition metal elements other than Ni and $0<Y\leq0.30$ a: $-0.10\leq a\leq0.10$ b: $-0.15\leq b\leq0.15$ (see, e.g., Japanese Unexamined Patent Publication No. HEI 10-79250 (pp. 2-7)).

Although the foregoing materials are excellent in cycle performance of a secondary battery when used in a positive electrode for a lithium secondary battery, no mention has been made to the thermal stability, capacity, rate performance, and charge/discharge efficiency thereof.

The present inventors had conducted research on a positive electrode material for a lithium secondary battery, made a further examination of an amount of Ba in Li—Ni—Co—Ba—O system technology similar to the technology mentioned above, and proposed a material giving a high thermal stability and a large capacity under a limited range of Ba content (see, e.g., Japanese Unexamined Patent Publication No. 2001-173285 (pp. 3-11)).

As a result of pursuing research on the improvement of the properties of the positive electrode material for a lithium secondary battery, the present inventors have developed a material with more excellent charge/discharge efficiency and cycle performance.

SUMMARY OF THE INVENTION

It is therefore an object of the present invention to provide a novel positive electrode material for a lithium secondary battery with such excellent performance, to a method for producing the same, and to a lithium secondary battery.

The present invention provides a positive electrode material for a lithium secondary battery which is high in safety, high in capacity, excellent in cycle performance, and high in charge/discharge efficiency.

The present invention is a positive electrode material powder for a lithium secondary battery, containing either one of a Li—Ni—Co—O or Li—Ni—Co—Ba—O system component as a main component, wherein a particle which constitutes the powder has an amorphous phase of an oxide.

More particularly, the present invention is a positive electrode material powder for a lithium secondary battery, wherein the particle has an amorphous phase of an oxide dispersed within the particle.

Further, the present invention is a positive electrode material powder for a lithium secondary battery, wherein the particle has an amorphous phase of an oxide formed on a surface of the particle.

Additionally, the present invention is a positive electrode material powder for a lithium secondary battery, wherein the particle has an amorphous phase dispersed within the particle and formed on a surface of the particle.

Preferably, a constituent component of the amorphous phase of the oxide in the present invention is composed of an oxide of one or a plurality of elements selected from the group consisting of Li, Na, K, Si, Ba, B, P, and Al, which allows easy formation of the amorphous phase of the oxide.

The positive electrode material for a lithium secondary battery according to the present invention is generally a composite oxide having a total composition represented by $Li_a Ni_b Co_c Ba_d M_e O_x$ where M: one or a plurality of elements selected from the group consisting of Na, K, Si, B, P, and Al a/(b+c): 0.9 to 1.1 b/(b+c): 0.5 to 0.95 c/(b+c): 0.05 to 0.5 d/(b+c): 0.0005 to 0.01 e/(b+c): below 0.01 (not inclusive of 0)

b+c=1 x: not particularly specified.

The foregoing positive electrode material for a lithium secondary battery can be produced by a following method.

(1) A component for forming an amorphous phase of an oxide which is composed of one or a plurality of elements selected from the group consisting of Li, Na, K, Si, Ba, B, P, and Al is mixed with a Li—Ni—Co—O or Li—Ni—Co—Ba—O system raw material and the resulting mixture is fired. The arrangement allows the production of a positive electrode material for a lithium secondary battery having an amorphous phase of an oxide dispersed within a secondary particle as aggregate of primary particles.

(2) A Li—Ni—Co—O or Li—Ni—Co—Ba—O system raw material is fired, a component for forming an amorphous phase of an oxide which is composed of one or a plurality of elements selected from the group consisting of Li, Na, K, Si, Ba, B, P, and Al is added to a powder resulting from the firing, and the resulting mixture is re-fired. The arrangement allows the production of a positive electrode material for a lithium secondary battery having an amorphous phase of an oxide formed at a surface of each particle.

(3) A component for forming an amorphous phase of an oxide which is composed of one or a plurality of elements selected from the group consisting of Li, Na, K, Si, Ba, B, P, and Al is mixed with a Li—Ni—Co—O or Li—Ni—Co—Ba—O system raw material and the resulting mixture is fired. Then, a component for forming an amorphous phase of an oxide which is composed of one or a plurality of elements selected from the group consisting of Li, Na, K, Si, Ba, B, P, and Al is further mixed in the fired mixture and the resulting mixture is re-fired. The arrangement allows the production of a positive electrode material for a lithium secondary battery having an amorphous phase of an oxide dispersed within a particle and also at a surface of each particle.

The present invention also provides a lithium secondary battery comprising a positive electrode composed of any of the foregoing positive electrode materials for a lithium secondary battery.

DETAILED DESCRIPTION OF THE PREFERRED EMBODIMENTS

The present invention provides a positive electrode material powder for a lithium secondary battery containing a Li—Ni—Co—O or Li—Ni—Co—Ba—O system component as a main component, which is characterized in that a particle which constitutes the powder has an amorphous phase of an oxide:

wherein an amorphous phase of an oxide is (A) dispersed within a particle, (B) formed at the surface of a particle, or (C) dispersed within a particle and formed at the surface thereof.

The action of an amorphous phase of an oxide is not completely clear but is considered to have the following characteristics: the amorphous phase improves permeability of an electrolyte, and thus has the effect of increasing the discharge capacity and charge/discharge efficiency. On the other hand, the prevention of the falling off of the positive electrode material even during the expansion or shrinkage of a Li—Ni—Co—O or Li—Ni—Co—Ba—O system composite oxide crystal caused by charge/discharge operations has made it possible to improve the cycle performance. It is also effective in preventing gelation in the process of producing an electrode and increasing the density of electrode.

It is unnecessary for the all amount of an added element being able to produce an amorphous phase of an oxide such as Li, Na, K, Si, Ba, B, P, and Al to serve as a material for producing the amorphous phase of the oxide. A part of the amount of the element being able to produce the amorphous phase of the oxide may be included appropriately in the Li—Ni—Co—O or Li—Ni—Co—Ba—O system crystal.

A component of an amorphous phase of an oxide is one or a plurality of elements selected from the group consisting of Li, Na, K, Si, Ba, B, P, and Al. There are other elements which form an amorphous phase. Examples of the other elements are Ca, Mg, Zn, Ti, Sr, Zr, S, Fe, Ge, As, W, Mo, Te, F, and the like. These elements may be included in an amorphous oxide phase which contains one or a plurality of elements selected from the foregoing group consisting of Li, Na, K, Si, Ba, B, P, and Al.

A description will be given herein below to the reason for limiting numerical values.

The present invention has been achieved by improving a conventionally known positive electrode material for a lithium secondary battery containing a Li—Ni—Co—O or Li—Ni—Co—Ba—O system component as a main component.

The following numerical values represent the respective numbers of moles of the individual components when the total composition of a composite oxide as the positive electrode material for a lithium secondary battery according to the present invention is expressed as $Li_aNi_bCo_cBa_dAl_eO_x$ and the total number of moles of Ni and Co is assumed to be 1 (i.e., b+c=1).

The amount of Li is set to 0.9 to 1.1 mol. If the amount of Li is small, the resulting crystal structure contains a large number of lithium defects so that the capacity lowers. If the amount of Li is excessively large, a hydrate or a carbonate is generated, which causes gelation during the production of an electrode. Accordingly, the amount of Li is limited to the range of 0.9 to 1.1 mol.

Co has the characteristics of enhancing the thermal stability. On the other hand, a large number of Co decrease a discharge capacity, and thus the amount of Co is set to 0.05 to 0.5 mol.

To enhance the thermal stability, Ba is contained at an amount of 0.0005 to 0.01 mol. With Ba content of over 0.01 mol., discharge capacity will be decreased.

The amount of an amorphous phase of an oxide is set to below 0.01 mol. However, zero is not included. If the amount of the amorphous phase of the oxide is over 0.01 mol., discharge capacity may be decreased. It is necessary for an amorphous phase of an oxide to be present within a particle of a material powder of the present invention or at the surface thereof. Accordingly, zero is not included.

According to the present invention, a component for forming an amorphous phase of an oxide composed of one or plural elements selected from the group consisting of Li, Na, K, Si, Ba, B, P, and Al is mixed at an extremely small amount of below 0.01 mol. into a Li—Ni—Co—O or Li—Ni—Co—Ba—O system raw material. Firing the resulting mixture allows production of a positive electrode material for a lithium secondary battery having an amorphous phase of an oxide within each of particles. The amorphous phase of the oxide generated is dispersed in dots in each of the particles of the Li—Ni—Co—O or Li—Ni—Co—Ba—O system material.

Further, a Li—Ni—Co—O or Li—Ni—Co—Ba—O system material is fired and ground. A component for forming an amorphous phase of an oxide composed of one or plural elements selected from the group consisting of Li, Na, K, Si, Ba, B, P, and Al is added and mixed at an extremely small amount of below 0.01 mol. into a powder resulting from the grinding. Re-firing the resulting mixture allows production of a positive electrode material for a lithium secondary battery having an amorphous phase of an oxide dispersed in dots at a surface of each of particles.

A description will be given herein below to the examples of the present invention.

Ni—Co—(OH)$_2$ suitable for use as a raw material of a Ni source and a Co source is prepared such that Co is contained at a molar ratio of 0.05 to 0.5 to a total amount of Ni and Co. During the production, a powder of dense secondary particles of Ni—Co—(OH)$_2$ is preferably produced by, e.g., wet solution synthesis to have an average particle diameter of 5 to 20 µm and a tap density of 1.8 g/cm$^3$ or more. When a lithium composite oxide is synthesized, the configuration and denseness of Ni—Co—(OH)$_2$ as a starting material is generally reflected on the synthesized lithium composite oxide.

As a raw material for forming an amorphous phase of an oxide composed of one or more elements selected from Li, Na, K, Si, Ba, B, P, Al, and the like, an oxide or a material which forms an oxide through firing can be used appropriately.

A nitrate of Li, Na, K, or Ba is used preferably and appropriately since the nitrate readily provides a Li—Ni—Co—O or Li—Ni—Co—Ba—O positive electrode material as a main component with an active property as it is highly reactive during firing to enhance the formation of an amorphous phase, and has a high oxidizing power. However, the present invention is not limited thereto.

For Si or Al, amorphous fine particles having a BET specific surface area of 100 $m^2/g$ or more is preferable and appropriate. However, the present invention is not limited thereto.

An oxide system amorphous phase composed of one or more elements selected from Li, Na, K, Si, Ba, B, P, Al, and the like acts effectively for the positive electrode material powder according to the present invention.

Although the foregoing raw materials can be used to form the oxide system amorphous phase, alternatively it is possible to use a glass powder.

Although the firing temperature is selected properly depending on the type of an amorphous phase of an oxide to be formed, firing is performed preferably in an oxidizing atmosphere at 900° C. or less for the prevention of the degradation of the properties to which the Li—Ni—Co—O or Li—Ni—Co—Ba—O system composite oxide contribute as a main component.

EXAMPLES

Examples 1-10, 17-19

As for the raw materials of the Ni and Co sources, three types of Ni—Co—$(OH)_2$ adjusted to have Co/(Ni+Co) molar ratios of 0.1, 0.2, and 0.3 were prepared by reactive crystallization process.

As for the other starting raw materials, commercially available chemicals were used, which were:

LiOH.$H_2O$ as the Li source,
$NaNO_3$ as the Na source,
$KNO_3$ as the K source,
Ba$(NO_3)_2$ as the Ba source,
$H_3BO_3$ as the B source,
$Al_2O_3$ as the Al source,
$SiO_2$ as the Si source, and
$P_2O_5$ as the P source.

Regarding $Al_2O_3$ and $SiO_2$, amorphous fine particles were used.

These starting raw materials were selected and weighed to achieve an objective blending composition. Then, the starting raw materials were mixed sufficiently to be used as raw materials for firing. Firing was performed in an oxygen atmosphere. First, the raw materials were held at 400° C. for 4 hours such that moisture in the raw materials were removed therefrom, then heated at a heating rate of 5° C./minute to a firing temperature and held for a time on a condition shown in Table 1. After cooling, the resulting fired material was retrieved from a furnace.

The retrieved fired material was ground to provide a positive electrode material powder. The resulting powder was subjected to particle size distribution measurement by a laser diffraction method and to chemical analysis. An average particle diameter measured by particle size distribution measurement and respective numbers of moles of the individual elements to the total number of moles of Ni+Co (Ni+Co=1) resulting from chemical analysis are shown in Table 1.

Then, a positive electrode for a lithium secondary battery was produced from the resulting positive electrode material powder and characteristics of a lithium secondary battery were evaluated by a method which will be described later. Table 2 shows the result of evaluation.

Comparative Examples 1-3

The production of the positive electrode material powder and the positive electrode was performed by using the same raw materials and performing the same firing process as used and performed in the Examples, except for the blending compositions that had been changed.

The components and characteristics of a lithium secondary battery are shown in Tables 1 and 2 in the same manner as in the Examples.

The method for evaluating the positive electrode characteristics will be shown herein below.

N-methyl-2-pyrrolidone was added to a total of 90 mass % of each of the positive electrode material for a lithium secondary battery obtained in the examples and comparative examples, 5 mass % of acetylene black, and 5 mass % of polyvinylidene fluoride and all together kneaded sufficiently. Aluminum substrata with a thickness of 20 µm were each coated with the resulting mixtures to be dried, pressed by a roller press to have a thickness of 80 µm, and punched out to provide samples each having a diameter of 14 mm. The samples were then vacuum dried at 150° C. for 15 hours to provide positive electrodes. A lithium metal sheet was used as a negative electrode material, while a porous film made of polypropylene was used as a separator. As an electrolyte, a solution prepared by dissolving 1 mol. of $LiPF_6$ in 1 liter of an ethylene carbonate (EC)/dimethyl carbonate (DMC) mixture at a volume ratio of 1:1 was used. Test cells were assembled in argon substituted glove boxes. The discharge capacities and the charge/discharge efficiencies were determined by performing charge/discharge measurement in the range of 3.0 to 4.2 V at a constant current density of 1.0 $mA/cm^2$. The rate performances were measured by further performing charge/discharge measurement in the range of 3.0 to 4.2 V at a constant current density of 5.0 $mA/cm^2$ and calculated in accordance with the following numerical expression:

Rate Performance (%)={(Discharge Capacity at 5.0 $mA/cm^2$)/(Discharge Capacity at 1.0 $mA/cm^2$)}×100.

The cycle performances were measured up to 100 cycles by assembling similar test cells and performing charge/discharge measurement in the range of 3.0 to 4.2 V at a constant current density of 5.0 $mA/cm^2$ and calculated in accordance with the following numerical expression:

Cycle Performance (%)={(Discharge Capacity in 100-th Cycle)/(Discharge Capacity in 1st Cycle)}×100.

A lithium secondary battery for a nail penetration test was prepared as follows.

89 mass % of the positive electrode material powder for a lithium secondary battery synthesized in Example 3, 6 mass % of acetylene black, and 5 mass % of polyvinylidene fluoride were mixed in the foregoing proportions. N-methyl-2-pyrrolidone was added to the mixture and sufficiently kneaded. An aluminum substratum with a thickness of 20 µm was coated with the resulting mixture to be dried and then pressed, whereby a positive electrode was produced. In the meantime, N-methyl-2-pyrrolidone was added to a total of 92 mass % of carbon black, 3 mass % of acetylene black, and 5 mass % of polyvinylidene fluoride and all together kneaded sufficiently. A copper substratum with a thickness of 14 μm was coated with the resulting mixture to be dried and then pressed, whereby a negative electrode was produced. The respective thicknesses of the positive and negative electrodes were 75 μm and 100 μm. A 60 mm×35 mm rectangle battery with a thickness of 4 mm was prepared by using, as an electrolyte, a solution prepared by dissolving 1 mol. of $LiPF_6$ in 1 liter of an ethylene carbonate (EC)/methyl ethyl carbonate (MEC) solution mixture at a volume ratio of 1:1, using a porous film made of polypropylene as a separator, and using an aluminum-laminated film bag. Charging was performed at a current value of 160 mA till 4.2 V. A discharge capacity was measured at the same current value down to 3.0 V, which was 800 mAh.

Batteries according to Examples Nos. 6, 9, 11, 14, 16 and 17 and Comparative Examples Nos. 1 to 3 were produced by the same method using the respective positive electrode materials for a lithium secondary battery synthesized under the individual conditions. The nail penetration test was conducted by charging each of the batteries at a constant current value of 160 mA and with a constant voltage for 8 hours till 4.2V. Then, the center portion of each of the batteries was penetrated by a nail with a diameter of 2.5 mm at a rate of 15 mm/second and the states of the batteries after penetration were observed. In the case of no fuming, no ignition, and no rupture, the battery was judged to have passed the test. If any fuming, ignition, or the like was observed, the battery was judged to have failed.

Examples 11-16

An initial product was obtained by using the same raw materials and the same firing method as used in Examples 1-10. Extra components shown in Table 3 were added to the initial product, re-firing was performed in an oxygen atmosphere, and the fired materials were ground to provide positive electrode material powders. In Examples 11, 13, 14, and 15, an amorphous phase of an oxide is formed on the surface of each of particles. In Examples 12 and 16, an amorphous phase of an oxide is formed within each of particles and on the surface thereof. Table 3 shows the respective average particle diameters and molar ratios of the individual elements measured by laser diffraction and chemical analysis, respectively. Positive electrodes for a lithium secondary battery were produced from the obtained positive electrode material powders and the battery performances were evaluated, the result of which is shown in Table 4. The lithium secondary battery in the examples of the present invention are high in discharge capacity, high in charge/discharge efficiency, excellent in rate performance and cycle performance, and has also passed the nail penetration test.

TABLE 1

| No. | Firing temperature (°C.) | Holding time (Hr) | Total composition (without reference to the oxygen content) | Average particle diameter (μm) |
|---|---|---|---|---|
| Example | | | | |
| 1 | 800 | 5 | $Li_{1.05}Ni_{0.8}Co_{0.2}Ba_{0.007}P_{0.005}$ | 7.3 |
| 2 | 775 | 4 | $Li_{1.09}Ni_{0.8}Co_{0.2}Ba_{0.005}P_{0.006}$ | 7.5 |
| 3 | 725 | 10 | $Li_{1.01}Ni_{0.8}Co_{0.2}Ba_{0.003}Si_{0.008}$ | 6.9 |
| 4 | 750 | 8 | $Li_{1.08}Ni_{0.7}Co_{0.3}Ba_{0.007}Si_{0.009}$ | 11.1 |
| 5 | 800 | 5 | $Li_{1.07}Ni_{0.8}Co_{0.2}Ba_{0.004}B_{0.005}$ | 7.7 |
| 6 | 775 | 10 | $Li_{1.06}Ni_{0.8}Co_{0.2}Ba_{0.002}B_{0.008}$ | 7.5 |
| 7 | 725 | 6 | $Li_{1.02}Ni_{0.7}Co_{0.3}Ba_{0.001}Al_{0.008}$ | 11.3 |
| 8 | 750 | 8 | $Li_{1.03}Ni_{0.9}Co_{0.1}Ba_{0.005}Al_{0.006}$ | 15.3 |
| 9 | 770 | 10 | $Li_{1.05}Ni_{0.8}Co_{0.2}Ba_{0.003}Na_{0.004}B_{0.005}$ | 8.1 |
| 10 | 750 | 3 | $Li_{1.05}Ni_{0.8}Co_{0.2}Ba_{0.003}K_{0.004}Si_{0.005}$ | 7.9 |
| 17 | 750 | 5 | $Li_{1.04}Ni_{0.8}Co_{0.2}Ba_{0.003}B_{0.0001}$ | 8.5 |
| 18 | 770 | 5 | $Li_{1.06}Ni_{0.8}Co_{0.2}Ba_{0.002}Na_{0.0003}$ | 7.5 |
| 19 | 750 | 8 | $Li_{1.03}Ni_{0.8}Co_{0.2}Ba_{0.003}K_{0.0005}$ | 8.3 |
| Comp. Ex. | | | | |
| 1 | 720 | 10 | $Li_{1.02}Ni_{0.7}Co_{0.3}Ba_{0.001}$ | 11.1 |
| 2 | 800 | 5 | $Li_{1.02}Ni_{0.8}Co_{0.2}$ | 7.5 |
| 3 | 750 | 8 | $Li_{0.98}Ni_{0.9}Co_{0.1}Ba_{0.02}$ | 14.9 |

TABLE 2

| No. | Total composition (without refernce to the oxygen content) | 1st discharge capacity (mAh/g) | 1st charge/ discharge efficiency (%) | Rate performance (%) | Cycle performance (%) | Nail penetration test |
|---|---|---|---|---|---|---|
| Example | | | | | | |
| 1 | $Li_{1.05}Ni_{0.8}Co_{0.2}Ba_{0.007}P_{0.005}$ | 187 | 91.6 | 89.2 | 93.7 | Not performed |
| 2 | $Li_{1.09}Ni_{0.8}Co_{0.2}Ba_{0.005}P_{0.006}$ | 188 | 91.1 | 89.4 | 94.2 | Not performed |
| 3 | $Li_{1.01}Ni_{0.8}Co_{0.2}Ba_{0.003}Si_{0.008}$ | 189 | 90.6 | 89.7 | 92.8 | Passed |
| 4 | $Li_{1.08}Ni_{0.7}Co_{0.3}Ba_{0.007}Si_{0.009}$ | 187 | 91.2 | 88.7 | 94.5 | Not performed |
| 5 | $Li_{1.07}Ni_{0.8}Co_{0.2}Ba_{0.004}B_{0.005}$ | 186 | 91.3 | 89.6 | 94.3 | Not performed |
| 6 | $Li_{1.06}Ni_{0.8}Co_{0.2}Ba_{0.002}B_{0.008}$ | 188 | 92.3 | 89.7 | 93.5 | Passed |
| 7 | $Li_{1.02}Ni_{0.7}Co_{0.3}Ba_{0.001}Al_{0.008}$ | 188 | 91.2 | 89.9 | 93.7 | Not performed |

TABLE 2-continued

| No. | Total composition (without refernce to the oxygen content) | 1st discharge capacity (mAh/g) | 1st charge/ discharge efficiency (%) | Rate performance (%) | Cycle performance (%) | Nail penetration test |
|---|---|---|---|---|---|---|
| 8 | $Li_{1.03}Ni_{0.9}Co_{0.1}Ba_{0.005}Al_{0.006}$ | 187 | 91.4 | 89.7 | 94.1 | Not performed |
| 9 | $Li_{1.05}Ni_{0.8}Co_{0.2}Ba_{0.003}Na_{0.004}B_{0.005}$ | 186 | 90.2 | 88.8 | 94.9 | Passed |
| 10 | $Li_{1.05}Ni_{0.8}Co_{0.2}Ba_{0.003}K_{0.004}Si_{0.005}$ | 188 | 90.9 | 88.7 | 93.4 | Not performed |
| 17 | $Li_{1.04}Ni_{0.8}Co_{0.2}Ba_{0.003}B_{0.0001}$ | 187 | 91.2 | 89.5 | 93.5 | Passed |
| 18 | $Li_{1.06}Ni_{0.8}Co_{0.2}Ba_{0.002}Na_{0.0003}$ | 188 | 91.8 | 89.0 | 93.8 | Not performed |
| 19 | $Li_{1.03}Ni_{0.8}Co_{0.2}Ba_{0.003}K_{0.0005}$ | 188 | 91.0 | 89.1 | 94.0 | Not performed |
| Comp. Ex. | | | | | | |
| 1 | $Li_{1.02}Ni_{0.7}Co_{0.3}Ba_{0.001}$ | 180 | 86.5 | 84.2 | 91.5 | Passed |
| 2 | $Li_{1.02}Ni_{0.8}Co_{0.2}$ | 188 | 83.5 | 81.5 | 80.7 | Failed |
| 3 | $Li_{0.98}Ni_{0.9}Co_{0.1}Ba_{0.02}$ | 160 | 84.2 | 82.8 | 82.7 | Failed |

TABLE 3

| | | Initial firing | | | Re-firing | |
|---|---|---|---|---|---|---|
| No. | Compound composition | Firing temperature (° C.) | Holding time (Hr) | Added components | Firing temperature (° C.) | Holding time (Hr) |
| 11 | Li—Ni—Co—O | 800 | 5 | $LiNO_3$, $Ba(NO_3)_2$, $P_2O_5$ | 600 | 3 |
| 12 | Li—Ni—Co—Ba—Si—O | 775 | 4 | $SiO_2$ | 500 | 2 |
| 13 | Li—Ni—Co—Ba—O | 725 | 10 | $LiNO_3$, $H_3BO_3$ | 600 | 5 |
| 14 | Li—Ni—Co—Ba—O | 750 | 8 | $Al_2O_3$ | 600 | 2 |
| 15 | Li—Ni—Co—Ba—O | 800 | 5 | $NaNO_3$, $H_3BO_3$ | 650 | 2 |
| 16 | Li—Ni—Co—Ba—K—Si—O | 775 | 10 | $LiNO_3$, $Ba(NO_3)_2$, $KNO_3$, $SiO_2$ | 775 | 1 |

| | Final product | |
|---|---|---|
| No. | Total composition (without reference to the oxygen content) | Average particle diameter (μm) |
| 11 | $Li_{1.06}Ni_{0.7}Co_{0.3}Ba_{0.003}P_{0.007}$ | 11.3 |
| 12 | $Li_{1.05}Ni_{0.8}Co_{0.2}Ba_{0.002}Si_{0.005}$ | 7.2 |
| 13 | $Li_{1.04}Ni_{0.8}Co_{0.2}Ba_{0.003}B_{0.009}$ | 7.1 |
| 14 | $Li_{1.08}Ni_{0.8}Co_{0.2}Ba_{0.003}Al_{0.007}$ | 7.4 |
| 15 | $Li_{1.01}Ni_{0.9}Co_{0.1}Ba_{0.004}Na_{0.004}B_{0.005}$ | 15.1 |
| 16 | $Li_{1.04}Ni_{0.8}Co_{0.2}Ba_{0.004}K_{0.004}Si_{0.003}$ | 7.2 |

TABLE 4

| No. | Total composition (without reference to the oxygen content) | 1st discharge capacity (mAh/g) | 1st charge/ discharge efficiency (%) | Rate performance (%) | Cycle performance (%) | Nail penetration test |
|---|---|---|---|---|---|---|
| 11 | $Li_{1.06}Ni_{0.7}Co_{0.3}Ba_{0.003}P_{0.007}$ | 191 | 92.0 | 89.2 | 92.4 | Passed |
| 12 | $Li_{1.05}Ni_{0.8}Co_{0.2}Ba_{0.002}Si_{0.005}$ | 193 | 90.7 | 89.6 | 94.2 | Not performed |
| 13 | $Li_{1.04}Ni_{0.8}Co_{0.2}Ba_{0.003}B_{0.009}$ | 190 | 90.7 | 89.4 | 92.6 | Not performed |
| 14 | $Li_{1.08}Ni_{0.8}Co_{0.2}Ba_{0.003}Al_{0.007}$ | 190 | 91.5 | 88.7 | 92.5 | Passed |
| 15 | $Li_{1.01}Ni_{0.9}Co_{0.1}Ba_{0.004}Na_{0.004}B_{0.005}$ | 190 | 91.0 | 89.5 | 92.7 | Not performed |
| 16 | $Li_{1.04}Ni_{0.8}Co_{0.2}Ba_{0.004}K_{0.004}Si_{0.003}$ | 192 | 90.8 | 89.2 | 93.8 | Passed |

What is claimed is:

1. A positive electrode material powder for a lithium secondary battery containing a $Li_aNi_bCo_cBa_dM_eO_x$ system component as a main component, wherein:
   each particle which constitutes the powder has an amorphous phase of an oxide containing M which is at least one element selected from the group consisting of Na, K, Si, P and Al;
   a is from 1.01-1.09;
   b is from 0.7-0.9;
   c is from 0.1-0.3;
   d is from 0.0005-0.007;
   e is from 0.0003-0.009; and
   x is greater than 0.

2. A positive electrode material powder for a lithium secondary battery according to claim 1, wherein the particle has the amorphous phase of the oxide dispersed within the particle.

3. A positive electrode material powder for a lithium secondary battery according to claim 1, wherein the particle has the amorphous phase of the oxide formed on a surface of the particle.

4. A positive electrode material powder for a lithium secondary battery according to claim 1, wherein the particle has the amorphous phase of the oxide dispersed within the particle and formed on a surface of the particle.

5. A lithium secondary battery having a positive electrode composed of the positive electrode material for a lithium secondary battery as recited in claim 1.

6. A lithium secondary battery having a positive electrode composed of the positive electrode material for a lithium secondary battery as recited in claim 2.

7. A lithium secondary battery having a positive electrode composed of the positive electrode material for a lithium secondary battery as recited in claim 3.

8. A lithium secondary battery having a positive electrode composed of the positive electrode material for a lithium secondary battery as recited in claim 4.

9. A positive electrode material powder for a lithium secondary battery according to claim 1, wherein the amount of Ba in the system component is 0.001 to 0.005 mol ratio.

10. A positive electrode material powder for a lithium secondary battery according to claim 9, wherein the amount of Ba in the system component is 0.002 to 0.004 mol ratio.

11. A positive electrode material powder for a lithium secondary battery according to claim 1, wherein
    the at least one element is Al, and
    the amount of Al in the system component is 0.006 to 0.008 mol ratio.

12. A positive electrode material powder for a lithium secondary battery according to claim 1, wherein
    the amount of Ba in the system component is 0.002 to 0.004 mol ratio,
    the at least one element is Al, and
    the amount of Al in the system component is 0.006 to 0.008 mol ratio.

* * * * *